Nov. 1, 1955  T. JINKS  2,722,249
WOODWORKING MACHINE
Filed March 16, 1953  2 Sheets-Sheet 1

Thelma Jinks, INVENTOR.

BY Clarence A. O'Brien
and Harvey B. Jacobson
Attorneys

Nov. 1, 1955 T. JINKS 2,722,249
WOODWORKING MACHINE
Filed March 16, 1953 2 Sheets—Sheet 2
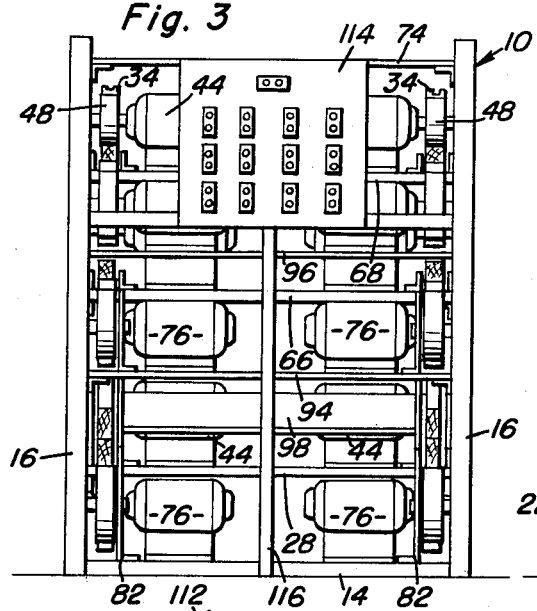
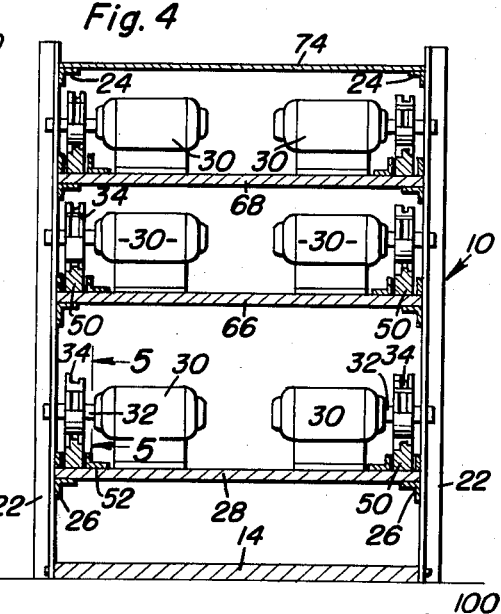
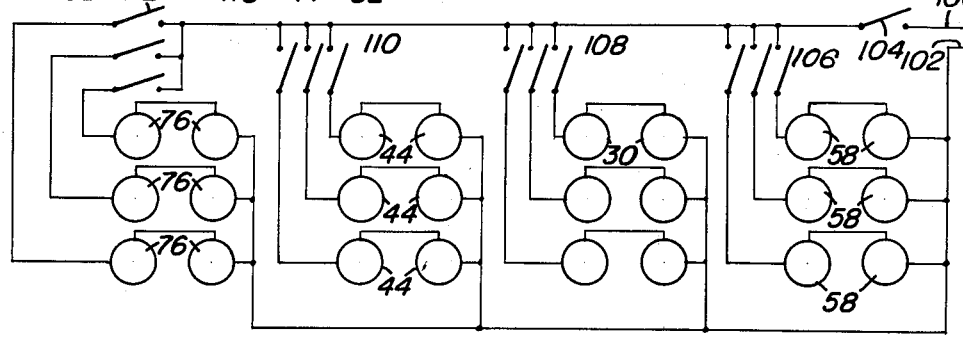
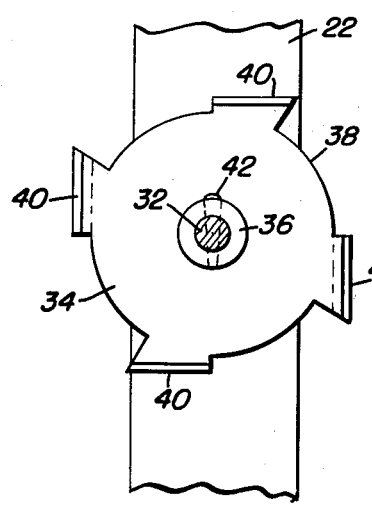
Thelma Jinks
INVENTOR.

United States Patent Office 2,722,249
Patented Nov. 1, 1955

2,722,249

WOODWORKING MACHINE

Thelma Jinks, South Gate, Calif.

Application March 16, 1953, Serial No. 343,554

6 Claims. (Cl. 144—134)

This invention relates in general to woodworking machines, and more specifically to an improved machine for cutting moldings.

While there have been devised numerous types of machines for cutting moldings out of sticks of wood, the machines generally employ a single cutter whereby a single line of sticks is cut through a semi-automatic operation and thereby requiring the services of one man for each cutter. It is therefore the primary object of this invention to provide an improved woodworking machine for cutting moldings which includes a plurality of molding cutting units mounted closely adjacent each other in a compact arrangement whereby a plurality of said units may be controlled by a single workman.

Another object of this invention is to provide an improved woodworking machine for cutting moldings, said woodworking machine include a supporting framework having a plurality of molding cutting units mounted therein, each of said units being provided with a conveyor for delivering sticks of wood to feeding means thereof, said supporting frame including storage racks disposed adjacent individual conveyors whereby sticks may be conveniently placed on the conveyors by a single workman.

A further object of this invention is to provide an improved woodworking machine which includes a supporting frame having a plurality of molding cutting units conveniently mounted therein in compact form, said molding cutting units being adapted to receive sticks at one end thereof and deliver moldings at the other end thereof, said molding cutting units being so arranged whereby moldings are delivered to a single platform.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an end elevational view of the woodworking machine of Figure 1 and shows the relationship of various conveyors thereof;

Figure 4 is an enlarged transverse vertical sectional view taken substantially upon the plane indicated by the section line 4—4 of Figure 1 and shows the arrangement of cutters of the various molding cutting units;

Figure 5 is an enlarged fragmentary sectional view taken substantially upon the plane indicated by the section line 5—5 of Figure 4 and shows the configuration of a suitable cutter; and, Figure 6 is a simplified wiring diagram for the woodworking machine.

Figure 1:
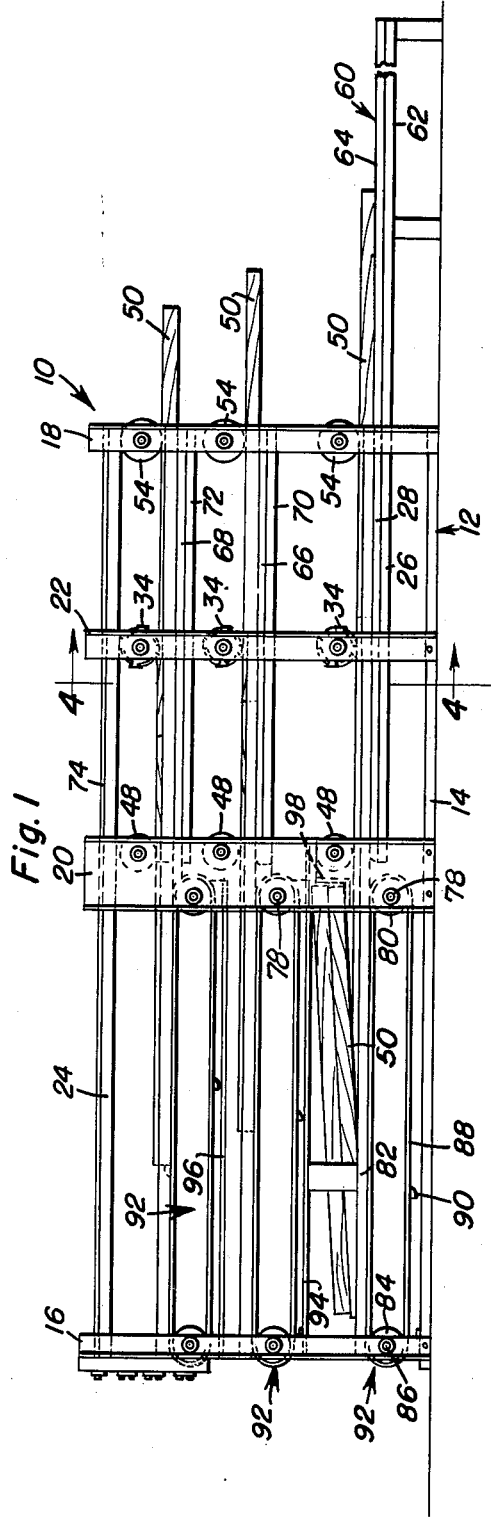
Figure 1 is a side elevational view of the improved woodworking machine, which is the subject of this invention, and shows the same in operation.

Referring now to the drawings in detail, it will be seen that the woodworking machine, which is the subject of this invention, is referred to in general by the reference numeral 10. The woodworking machine 10 includes a supporting frame which is referred to in general by the reference numeral 12.

The supporting frame 12 includes an elongated base 14 which has extending vertically therefrom at one end a pair of spaced parallel end members 16. Disposed adjacent to the other end of the base 14 is a second pair of spaced end members which are referred to by the reference numeral 18. Disposed between the end members 16 and 18 are spaced pairs of intermediate vertical members 20 and 22. Connecting the upper ends of the vertical members 16, 18, 20 and 22 are longitudinally extending upper frame members 24.

Carried by the vertical members 18 and 22 and projecting to points adjacent the vertical members 20 on each side of the supporting frame 12 are lower frame rails 26. Carried by the frame rails 26 and extending therebetween is a first shelf 28 which is disposed adjacent the base 14. Carried by the shelf 26 is a pair of molding cutting units, there being one molding cutting unit disposed adjacent each edge of the shelf 28. Each of the molding cutting units includes a motor 30 which is in alignment with an associated vertical member 22 and which has mounted on an armature shaft 32 thereof a cutter 34. As is best illustrated in Figure 5, the cutter 34 includes a central hub 36 on which is mounted a wheel portion 38. Carried by the wheel portion 38 are suitable cutters 40 of the configuration for the particular molding to be cut. The hub 36 is secured to the armature shaft 32 by a pin 42.

The individual molding cutting unit also includes a motor 44 disposed adjacent one of the vertical members 20 and carried by the shelf 28. The motor 44 has mounted on an armature shaft 46 thereof a friction wheel 48. The friction wheel 48 is disposed in longitudinal alignment with its associated cutter 34 and is disposed above the shelf 28 an amount equal to the height of a wood stick 50 therebeneath.

In order that the stick 50 may be aligned with the friction wheel 48 to facilitate the feeding of the same into the cutter 34, there is mounted on the shelf 28 in spaced parallel relation a pair of guide members 52 which are spaced a distance substantially equal to the width of the wooden stick 50. In this manner any wooden stick 50 passing under the friction wheel 48 will be engaged by the same and urged along the shelf 28 between the guide members 52.

The guide members 52 extend the full length of the shelf 28 and are disposed on opposite sides of a second friction wheel 54 which is in longitudinal alignment with the cutter 34 and the friction wheel 48. It is intended that the friction wheel 54 engage a wooden stick 50 after the same has been cut into a molding by the cutter 34 and withdraw the same from the cutter. The friction wheel 54 is mounted on an armature shaft 56 of an electric motor 58.

Disposed adjacent the right hand end of the supporting frame 12, as viewed in Figure 1, is a platform which is referred to in general by the reference numeral 60. The platform 60 includes a base 62 and a table portion 64. The table portion 64 is in alignment with the shelf 28 and forms a continuation thereof. As the wooden sticks 50, which have been converted into moldings by the cutters 32, move out of the woodworking machine 10 in response to the urging of the friction wheels 54, they pass onto the table portion 64 where they may be conveniently stacked or otherwise disposed of.

The woodworking machine 10 also includes a pair of upper shelves 66 and 68 which are identical to the shelf 28. The shelves 66 and 68 are supported by longitudinally extending frame rails 70 and 72, respectively, which are carried by the vertical members 18 and 22. Carried by each of the shelves 66 and 68 are molding cutting units arranged in the same manner as the molding cutting units carried by the shelf 28 with each of the molding cutting units including a cutter 34 and friction wheels 48 and 54. It will be understood that the cutters 34 are driven by individual motors 30 and the friction wheels 48 and 54 by individual motors 44 and 58, respectively. Also, there is associated with each group of friction wheels 48 and 54 and a cutter 34 spaced parallel guide members 52 forming guideways for wooden sticks 50 passing therethrough.

It will be noted that the shelf 66 is spaced a considerable distance above the shelf 28 while the shelf 68 is spaced a lesser distance thereabove. Also, the motors carried by the shelf 68 are protected by a longitudinal extending cover 74. The cover 74 is carried by the upper frame members 24 and unlike the shelves extends the full length of the supporting frame 10. The wooden sticks 50 which have been cut into moldings by their respective cutters 32 carried by the shelves 66 and 68 also pass onto the table portion 64 from their elevated positions whereby they may be conveniently stacked or stored with wooden sticks 50 passing from the molding cutting units carried by the shelf 28.

Mounted on the base 14 in transverse alignment with the vertical members 20 is a pair of spaced motors 76. The motors 76 face in opposite directions and have mounted on their respective armature shafts 78 drive wheels 80. The drive wheels 80 are in alignment with their respective friction wheels 48 and have their upper portions disposed below the plane of the upper surface of the shelf 28. Also carried by the base 14 and extending longitudinally thereof in spaced parallel relation is a pair of relatively high guide members 82.

Carried by the guide members 82 at their ends opposite from the drive wheels 80 are idler wheels 84 mounted on transverse shafts 86. The transverse shafts 86 are carried by the guide members 82 in transverse alignment with the end members 16.

The idler wheels 84 are of the same diameter as the drive wheels 80 and are in longitudinally alignment therewith. Entrained over the drive wheels 80 and the idler wheels 84 are endless conveyors 88. Carried by the conveyors 88 are lugs 90, the lugs 90 being disposed at spaced intervals and being adapted to engage ends of sticks 50 disposed on the conveyors 88.

When it is desired to form molding from a stick 50, the same is disposed on one of the conveyors 88 and urged into feeding relation with the friction wheel 48 aligned with the particular conveyor by one of the lugs 90. The feeder wheel 48 then feeds the stick 50 into the respective cutter 34.

It will be understood that the individual motors 76, the drive wheel 80 associated therewith, the idler wheel 86 and the conveyor 88 combine to form a conveyor unit which is referred to in general by the reference numeral 92. Each conveyor unit 92 carried by the base 14 is disposed adjacent opposite edges thereof.

As is best illustrated in Figure 3, there is also carried by the supporting frame 12 between the vertical members 16 and 20 vertically spaced platforms 94 and 96. Carried by each of these platforms is a pair of spaced conveyor units 92 which are aligned with the woodworking units carried by the shelves 66 and 68, respectively. It will be understood that the functions of the conveyor units 92 will be the same as that of the conveyor units carried by the base 14.

In order that additional sticks 50 may be conveniently disposed for feeding into the woodworking units, there is disposed adjacent the left end of the shelf 28, as is viewed in Figure 1, a transversely extending rack 98 which is in the form of an angle member carried by the vertical members 20 of the supporting framework 12. It is intended that additional sticks 50 have their forward ends rested upon the rack 98 and their rear ends, the left ends thereof as viewed in Figure 1, resting upon the next lower stick 50 carried by the associated conveyor 88. When it is desired to feed one of the additional sticks 50 into the woodworking unit of the shelf 28, the same is moved to the left, as viewed in Figure 1, until it is disengaged from the rack 98 at which time it is urged into feeding engagement with the friction wheel 48.

It will be understood that additional sticks 50 (not shown) may also be stored on the base 14 and the platforms 94 and 96 between the motors 76. Also, due to the relatively great distance between the base 14 and the platform 94, if it is so desired, there may be provided an additional platform (not shown) for the reception of additional sticks 50 and the storage of the same.

Referring now to Figure 6 in particular, it will be seen that there is illustrated a wiring diagram for the woodworking machine 10. The wiring diagram includes a pair of lead wires 100 and 102 which may be connected to a convenient power source. The lead wire 102 may be considered the ground wire and is connected to each of the electric motors 30, 44, 58 and 76. The other lead wire 100 is provided with a switch 104 for controlling operation of the entire woodworking machine. It will be noted that the associated pairs of motors carried by each of the shelves, platforms, and base are grouped in pairs. The electric motors 58 are controlled by three individual switches 106 and the electric motors 30 are controlled by three individual switches 108. The electric motors 44 are controlled by three individual switches 110 whereas the electric motors 76 are controlled by three switches 112. It will be understood that the wiring diagram is only a sample of the type of wiring diagram which may be utilized and may be varied as desired.

If desired, the individual switches may be mounted on a switchboard 114 which is best illustrated in Figure 3. Connected to the switchboard 114 is a conduit 116 for electrical wires.

Figure 2:
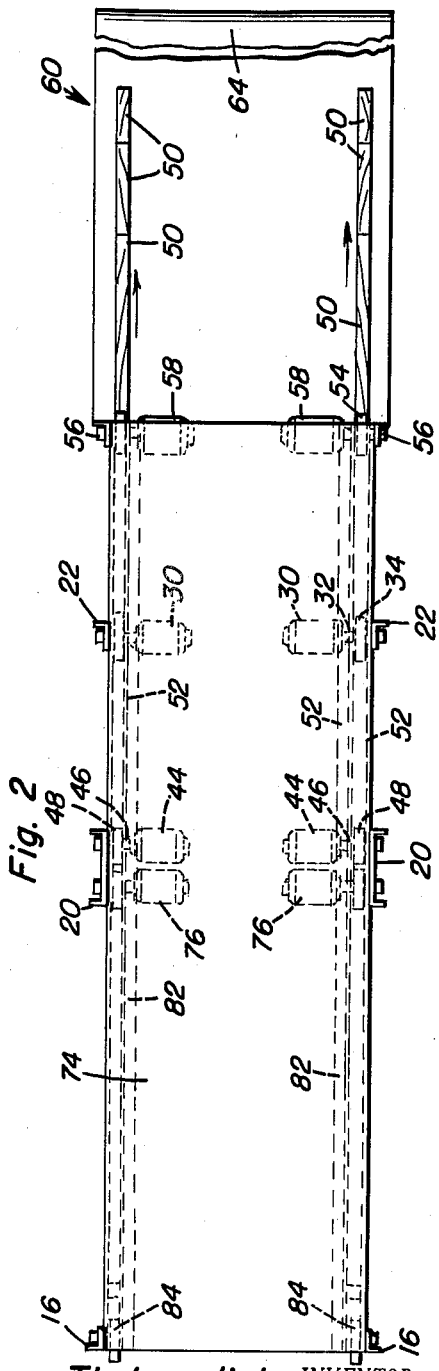
Figure 2 is a top plan view of the woodworking machine of Figure 1 and shows the relationship of various motors thereof for driving different elements of the same.

In order that transverse thrust on the various shafts may be better distributed, if desired, the outer ends of the shafts may be journaled in adjacent vertical support members, as is best shown in Figures 1 and 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A woodworking machine for forming moldings comprising a supporting frame, at least one shelf carried by said frame, molding cutting units disposed adjacent the side edges of said shelf and means for delivering individual sticks longitudinally to each of said molding cutting units, said means comprising a conveyor disposed adjacent each of said molding cutting units and longitudinally aligned therewith, each of said molding cutting units including a rotatable cutter, first means for feeding sticks from said conveyor longitudinally to said cutter and second means for withdrawing sticks from said cutter.

2. The combination of claim 1 wherein said first means of each molding cutting unit is disposed between said conveyor and said rotatable cutter and said second means of each molding cutting unit is disposed on the side of said rotatable cutter opposite said first means.

3. The combination of claim 2 wherein said rotatable cutter and said first and second means of each molding cutting unit are longitudinally aligned with each other and with a respective one of said conveyors.

4. A woodworking machine for forming moldings comprising a supporting frame, at least one shelf carried by said frame, molding cutting units disposed adjacent the side edges of said shelf and means for delivering individual sticks longitudinally to each of said molding cutting units, said means comprising a conveyor disposed adjacent each of said molding cutting units and longitudinally aligned therewith, each of said molding cutting units including a rotatable cutter, first means for feeding sticks from said conveyor longitudinally to said cutter and second means for withdrawing sticks from said cutter, said first and second means of each molding cutting unit each including a friction wheel engaging sticks passing therebeneath.

5. A woodworking machine for forming moldings comprising a supporting frame, at least one shelf carried by said frame, molding cutting units disposed adjacent the side edges of said shelf and means for delivering individual sticks longitudinally to each of said molding cutting units, said means comprising a conveyor disposed adjacent each of said molding cutting units and longitudinally aligned therewith, each of said molding cutting units including a rotatable cutter, first means for feeding stocks from said conveyor longitudinally to said cutter and second means for withdrawing sticks from said cutter, said first and second means of each molding cutting unit each including a friction wheel engaging sticks passing therebeneath, said conveyors, rotatable cutters and first and second means being each provided with individual drive means for actuating the same.

6. A woodworking machine for forming moldings comprising a supporting frame, at least one shelf carried by said frame, molding cutting units disposed adjacent the side edges of said shelf and means for delivering individual sticks longitudinally to each of said molding cutting units, said means comprising a conveyor disposed adjacent each of said molding cutting units and longitudinally aligned therewith, each of said molding cutting units including a rotatable cutter, first means for feeding stocks from said conveyor longitudinally to said cutter and second means for withdrawing sticks from said cutter, said first and second means of each molding cutting unit each including a friction wheel engaging sticks passing therebeneath, said conveyors, rotatable cutters and first and second means being each provided with individual drive means for actuating the same and control means for independently selectively controlling each of said conveyors, rotatable cutters and first and second means.

References Cited in the file of this patent

UNITED STATES PATENTS

| | | |
|---|---|---|
| 145,486 | Bruno | Dec. 16, 1873 |
| 289,219 | Carrier | Nov. 27, 1883 |
| 326,635 | Dutrisac | Sept. 22, 1885 |
| 773,939 | Johnson | Nov. 1, 1904 |

FOREIGN PATENTS

| | | |
|---|---|---|
| 83,381 | Germany | Oct. 3, 1895 |